(12) United States Patent
Oskouei

(10) Patent No.: US 6,672,591 B1
(45) Date of Patent: Jan. 6, 2004

(54) DRIVE PINS IN A MECHANICAL SEAL

(75) Inventor: Easa Taheri Oskouei, Rotherham (GB)

(73) Assignee: AES Engineering Limited, Rotherham (GB)

( * ) Notice: Subject to any disclaimer, the term of this patent is extended or adjusted under 35 U.S.C. 154(b) by 0 days.

(21) Appl. No.: 09/868,960

(22) PCT Filed: Dec. 22, 1999

(86) PCT No.: PCT/GB99/04236

§ 371 (c)(1),
(2), (4) Date: Aug. 21, 2001

(87) PCT Pub. No.: WO00/39487

PCT Pub. Date: Jul. 6, 2000

(30) Foreign Application Priority Data

Dec. 23, 1998 (GB) ................................................ 9828265

(51) Int. Cl.$^7$ ................................................ F16J 15/34
(52) U.S. Cl. ........................ 277/358; 277/373; 277/390
(58) Field of Search ................................ 277/358, 370, 277/372, 373, 445, 446, 390

(56) References Cited

U.S. PATENT DOCUMENTS

| | | | | |
|---|---|---|---|---|
| 3,672,689 A | * | 6/1972 | Hadley | 277/373 |
| 4,917,389 A | * | 4/1990 | Baker et al. | 277/372 |
| 5,085,250 A | * | 2/1992 | Kendrick | 138/40 |
| 5,489,105 A | * | 2/1996 | Attenasio et al. | 277/361 |
| 5,551,708 A |   | 9/1996 | Vesey et al. | 277/81 |
| 5,556,110 A |   | 9/1996 | Marsi et al. | 277/38 |
| 5,704,719 A | * | 1/1998 | Cook et al. | 277/370 |
| 6,305,693 B1 | * | 10/2001 | Wehrle | 277/370 |
| 6,357,753 B1 | * | 3/2002 | Yamasaki et al. | 277/370 |
| 6,386,547 B2 | * | 5/2002 | Wu et al. | 277/400 |

FOREIGN PATENT DOCUMENTS

| | | | |
|---|---|---|---|
| DE | 4415120 | 8/1995 | F16J/15/34 |
| GB | 2037905 A | * 7/1980 | |
| JP | 56-80559 | * 7/1981 | |

OTHER PUBLICATIONS

International Search Report corresponding to International Application No. PCT/GB 99/04236; mailed Apr. 14, 2000.

* cited by examiner

Primary Examiner—Robert J. Sandy
Assistant Examiner—André L. Jackson
(74) Attorney, Agent, or Firm—Myers Bigel Sibley & Sajovec

(57) ABSTRACT

A mechanical seal provides a sealing between a rotatable shaft and a housing. The seal has a stationary part for connection to the housing and a rotary part for rotation with the shaft. Mating sealing faces are carried by the stationary and rotary parts and the rotary parts are mounted on the drive shaft for rotation therewith. Each sealing face is held relatively stationary to their respective stationary or rotary part by means of at least one link member extending therebetween. The link member is arranged for at least limited longitudinal rotation.

7 Claims, 8 Drawing Sheets

DRIVE PINS IN A MECHANICAL SEAL

CROSS-REFERENCE TO RELATED APPLICATIONS

The present application claims priority under 35 U.S.C. § 371 from PCT Application No. PCT/GB99/04236 (published under PCT Article 21(2) in English), filed on Dec. 22, 1999, which claims the benefit of Great Britain Application Serial No. 9828265.0, filed on Dec. 23, 1998, the disclosures of which are incorporated by reference herein in their entireties.

FIELD OF THE INVENTION

This invention relates to the driving mechanism of a mechanical seal face, especially where the seal face is a soft or brittle material and its drive contact gets damage in respect of high pressure and rotation.

BACKGROUND OF THE INVENTION

A mechanical seal comprises a "floating" component which is mounted axially movably around the rotary shaft of, for example a pump and a "static" component which is axially fixed, typically being secured to a housing. The floating component has a flat annular end face, i.e. its seal face, directed towards a complementary seal face of the static component. The floating component is urged towards the static component to close the seal faces together to form a sliding face seal, usually by means of one or more springs. In use, one of the floating and static components rotates; this component is therefore referred to as the rotary component. The other of the floating and static components does not rotate and is referred to as the stationary component.

Those seals whose floating component is rotary are described as rotary seals. If the floating component is stationary, the seal is referred to as a stationary seal.

If the sliding seal between the rotary and stationary components are assembled and pre-set prior to despatch from the mechanical seal manufacturing premises, the industry terminology for this is "cartridge seal". If however the rotary and stationary components are despatched individually (unassembled) from the mechanical seal manufacturing premises, the industry terminology for this is "component seal".

Seal faces are generally held to their relevant stationary or rotary components by a mechanism that is called drive ring. One of the common mechanisms is the use of slots on the back of seal face and lugs on the drive ring or vice versa. FIG. 1 shows four slots on the seal face and four lugs on the drive ring. FIG. 2 shows two lugs on the seal face and two lugs on the drive ring. Rotation will be transferred from the seal faces to the drive ring at rotary faces or vice versa at the stationary faces.

Seal faces are mainly supplied from various grades of silicon carbide, tungsten carbide, ceramics and carbon. Carbon is categorised as a soft face.

The contact between the slots and lugs in FIGS. 1 and 2 is mainly point contact. Under point contact, soft or brittle seal faces are more prone to failure than hard faces, especially in high pressure and large seal size applications. The failure may start by notch propagation around the contact point which gradually grows until it destroys the seal face.

Instead of having lugs on the drive ring, some designs employ drive pins that are pressed firmly into holes in the drive ring. These pins cannot move or rotate from their location. FIG. 3-2 illustrates the use of two pins to drive a lug on the seal face when the seal rotates either in clockwise or counter-clockwise direction. If the mechanical seal is designed to only rotate in one direction, one pin can be used for each lug. Alternatively, the pin may be square, cylindrical or any other shape (See FIGS. 4-a and 4-b).

The drive ring may also be designed to drive the seal face around the outer diameter, inner diameter or axial end of said face. This is shown in FIG. 4 where point contacts between the lug and slot are labelled A and B.

SUMMARY OF THE INVENTION

The invention relates to a floating pin that allows the interface between the lug and the slot to be a line or face contact. Preferably the pin is of circular shank diameter, preferably with a square or rectangular head and is loosely fitted in a hole to allow free rotation of said pin about its axis.

BRIEF DESCRIPTION OF THE DRAWINGS

The present invention will now be described by way of example only with reference to the accompanying drawings wherein

FIG. 2-1 illustrates two lugs on the seal face and FIG. 2-2 shows two slots on the drive ring.

FIG. 5-c illustrates the contact areas on a rectangular head of a floating pin.

FIG. 8 illustrates the pin design at (1) and (2). After assembly of the seal, the loose pins will be held in their location and can rotate freely in their position around their axis in the functioning seal.

DETAILED DESCRIPTION OF THE PREFERRED EMBODIMENTS

Figure 1:
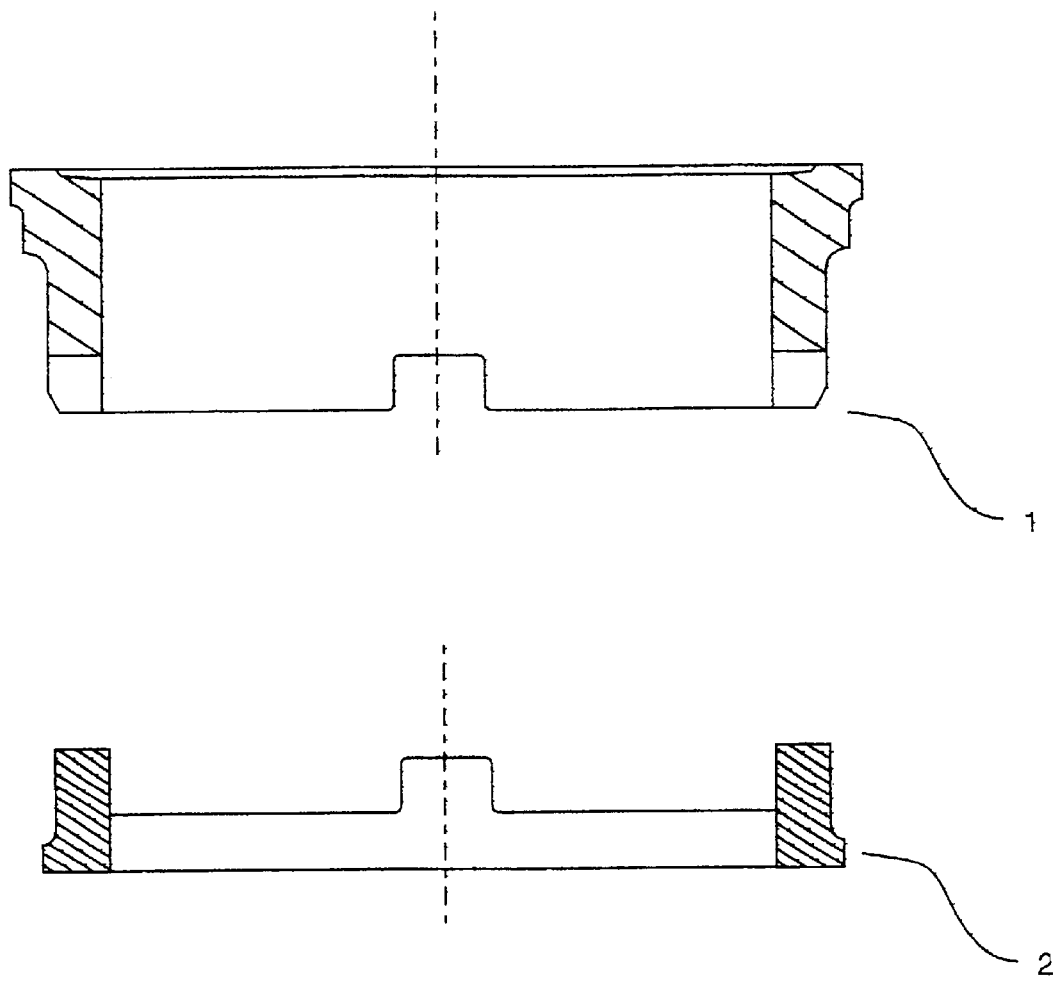
FIG. 1-1 illustrates four slots on the rear of a seal face which are driven by four lugs on a drive ring which is shown in FIG. 1-2.
Figure 2:
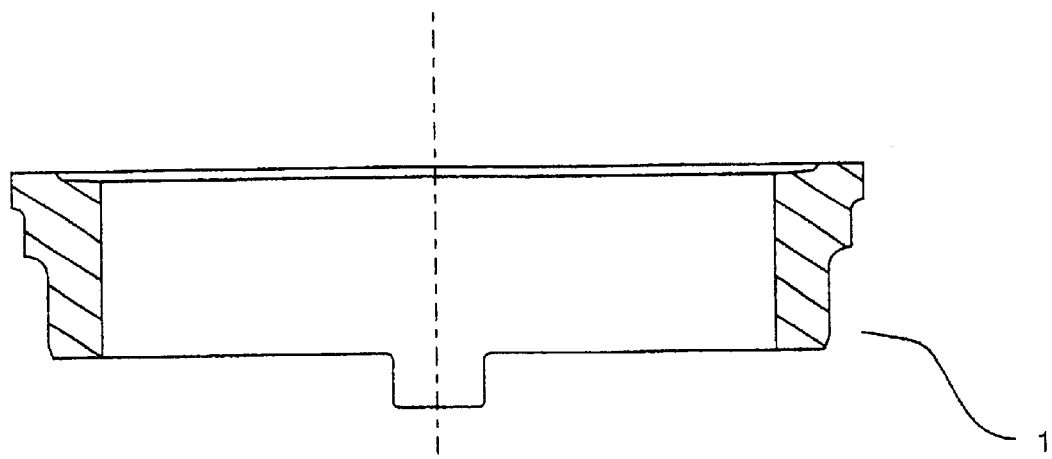
Figure 2:
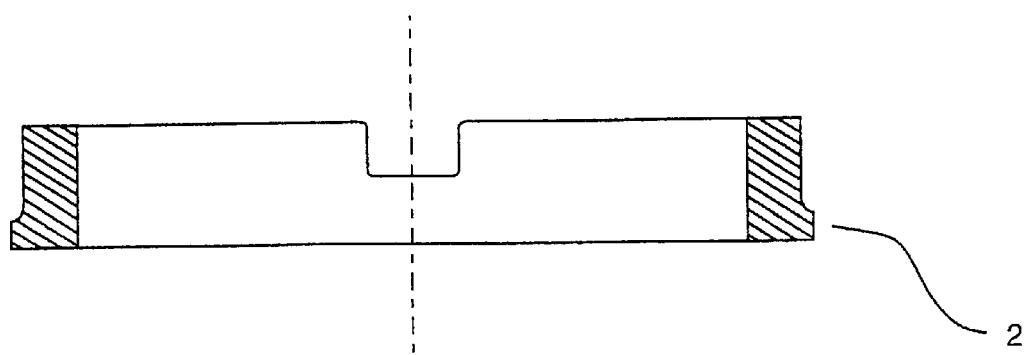
Figure 3:
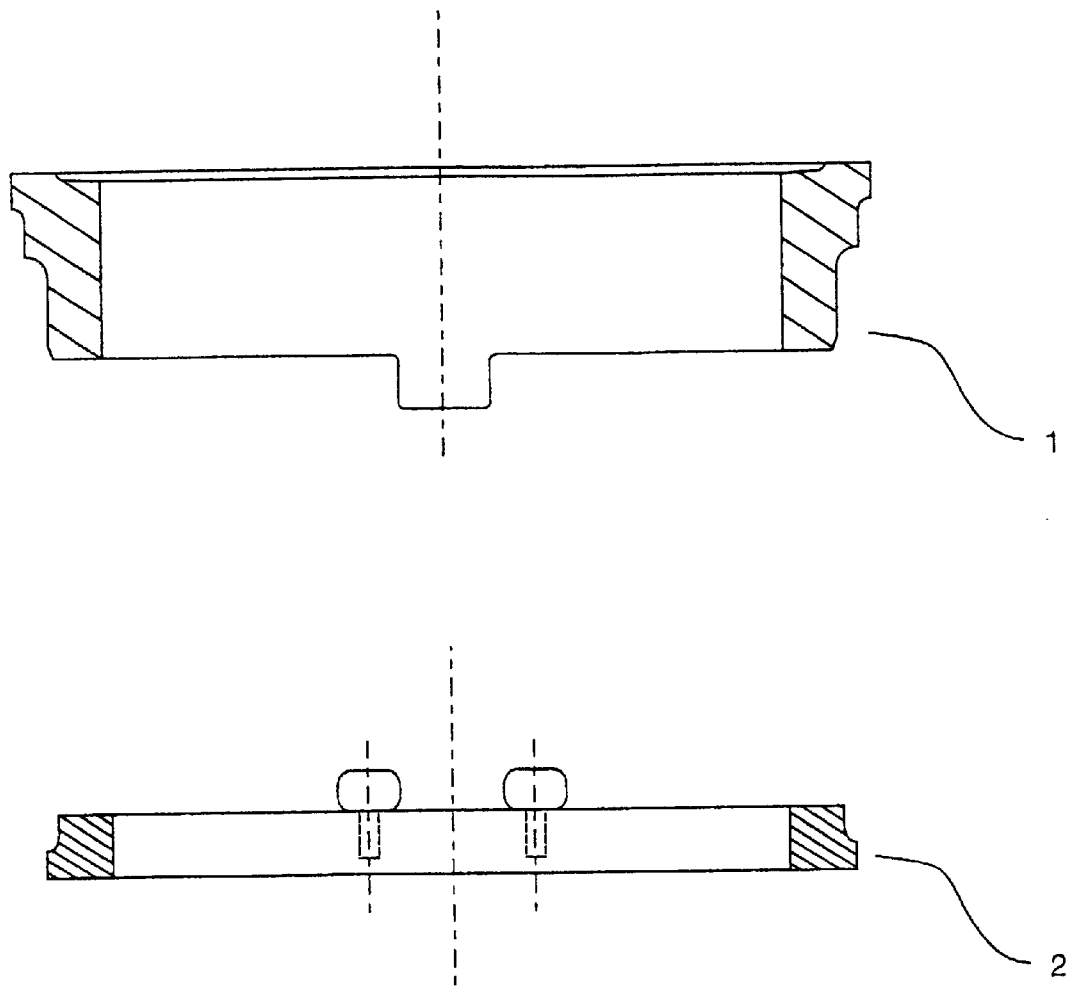
FIG. 3 illustrates the use of a pins which are pressed into a hole in the drive ring and which do the same job as the lugs in FIGS. 1 & 2.
Figure 4A:
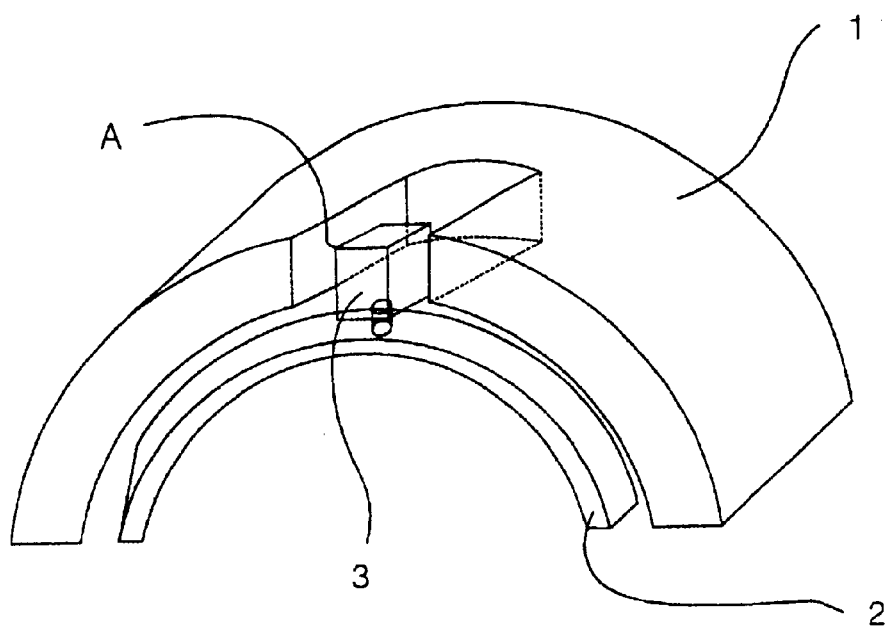
FIG. 4 illustrate a drive ring under the seal face upon which rectangular or cylindrical pins can be mounted. The point of contact is shown by A and B.
Figure 4B:
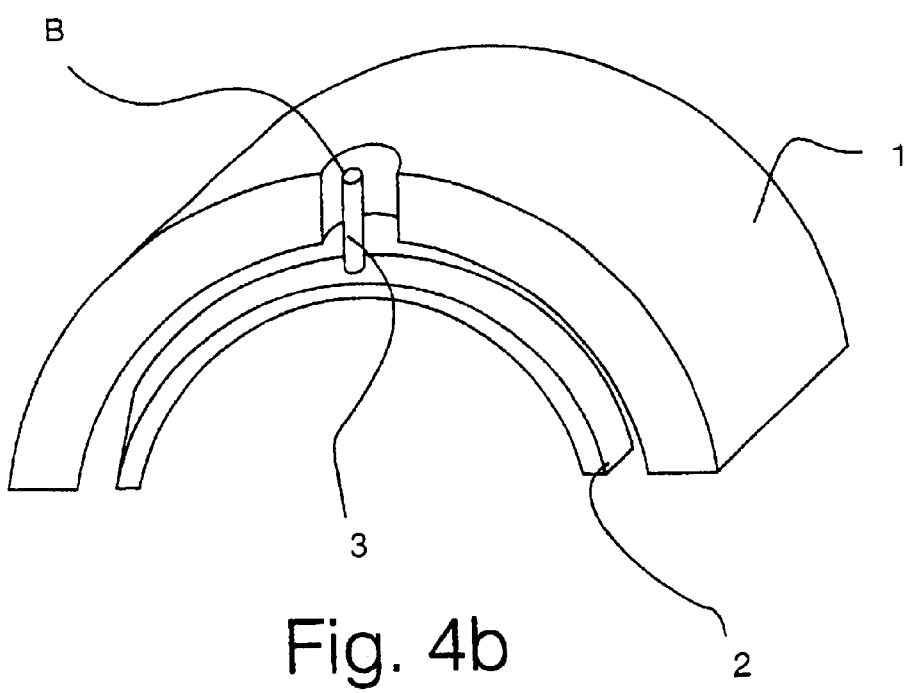
Figure 5A:
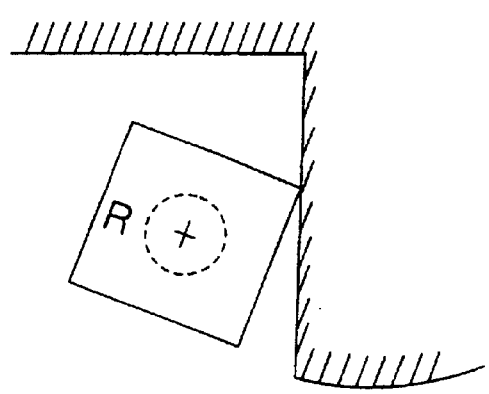
As shown in FIG. 5a, a fixed pin of any shape will mostly have a point contact.
Figure 5B:
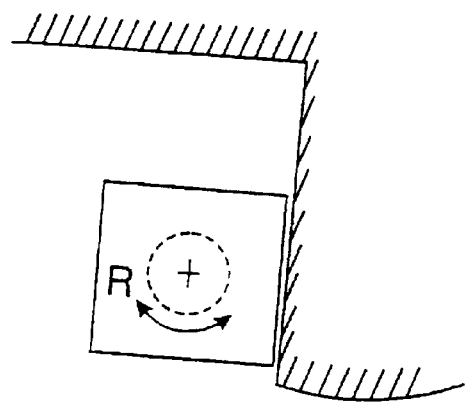
FIGS. 5-b and c illustrate that the floating pin design can rotate around the (R) axis and provide a face or line contact (C).
Figure 5C:
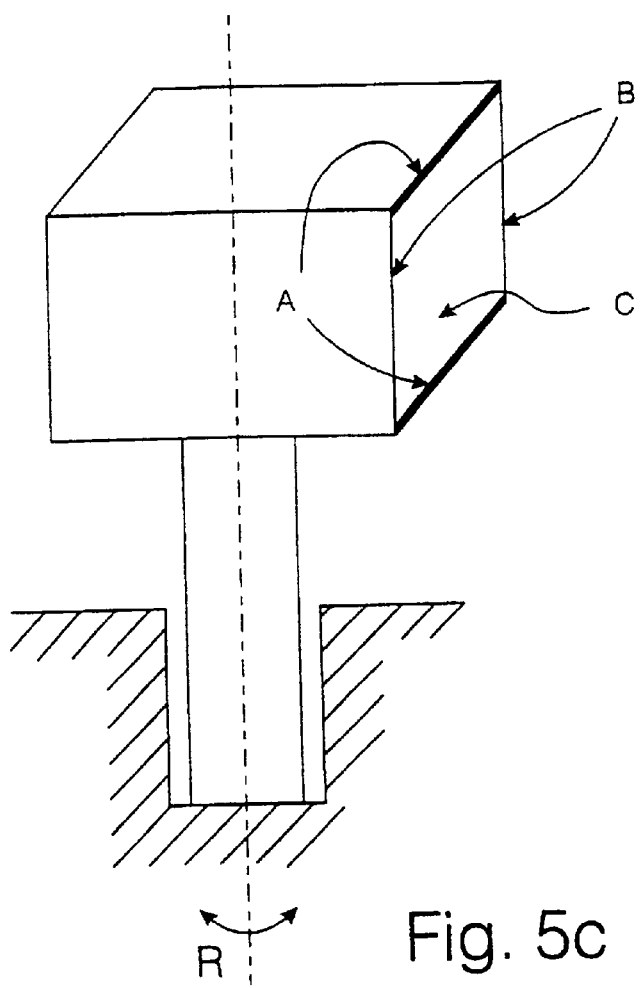

As shown in FIG. 5-a, the use of a fixed pin/lug on the drive ring means that there is no rotation allowed to the pin/lug. The contact area is a point contact. A similar design is demonstrated in FIG. 5-b using the floating pin. In this design because it is adjustable and not fixed, the pin can adjust its contact area to line/face contact. This will minimise the possibility of point contact between the pin/lug and slot.

Figure 6:
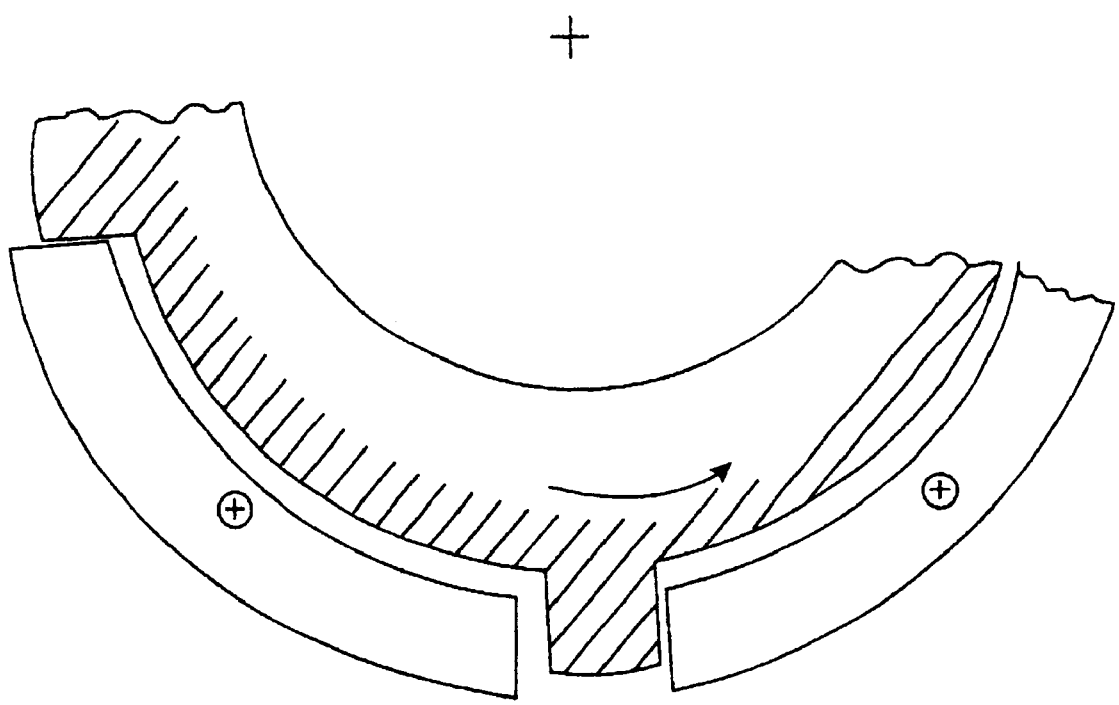
FIGS. 6 & 7 illustrate a different shape for the floating pin in which the surface contact is not flat but wherein face or line contact is achieved.
Figure 7:
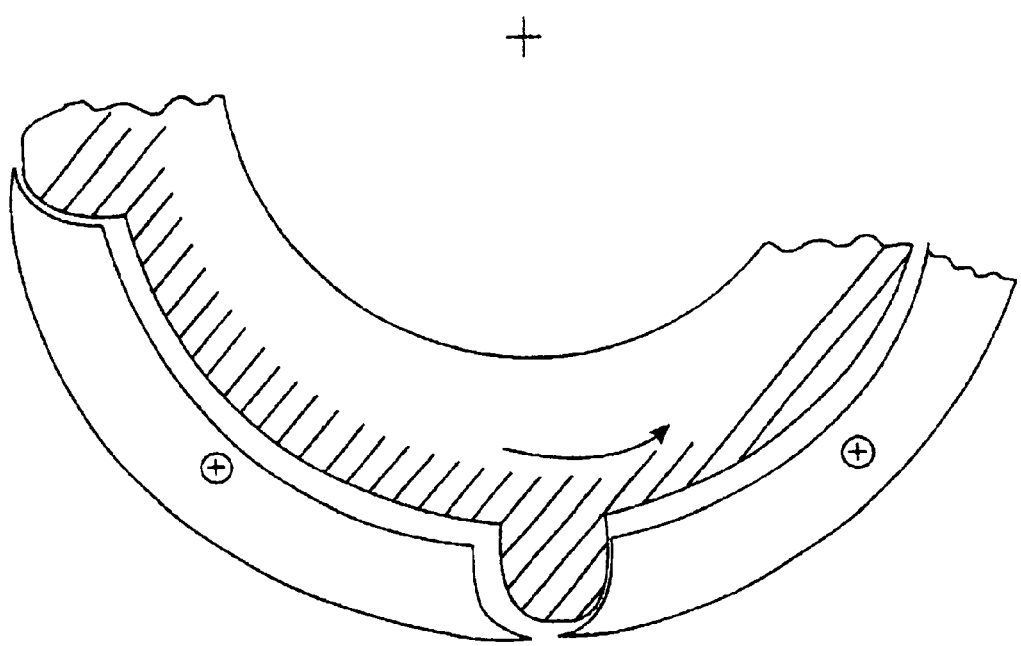

The pin's head may have different shapes which are related to the contact area at the slot. FIG. 6 illustrates a different shape for the head of the floating pin. FIG. 7 illustrates a different contact area between the floating pin and its relevant slot.

It should be understood that the invention may be employed for either rotary or stationary seals and single or double mechanical seals, whether designed in a cartridge or component seal format.

Figure 8:
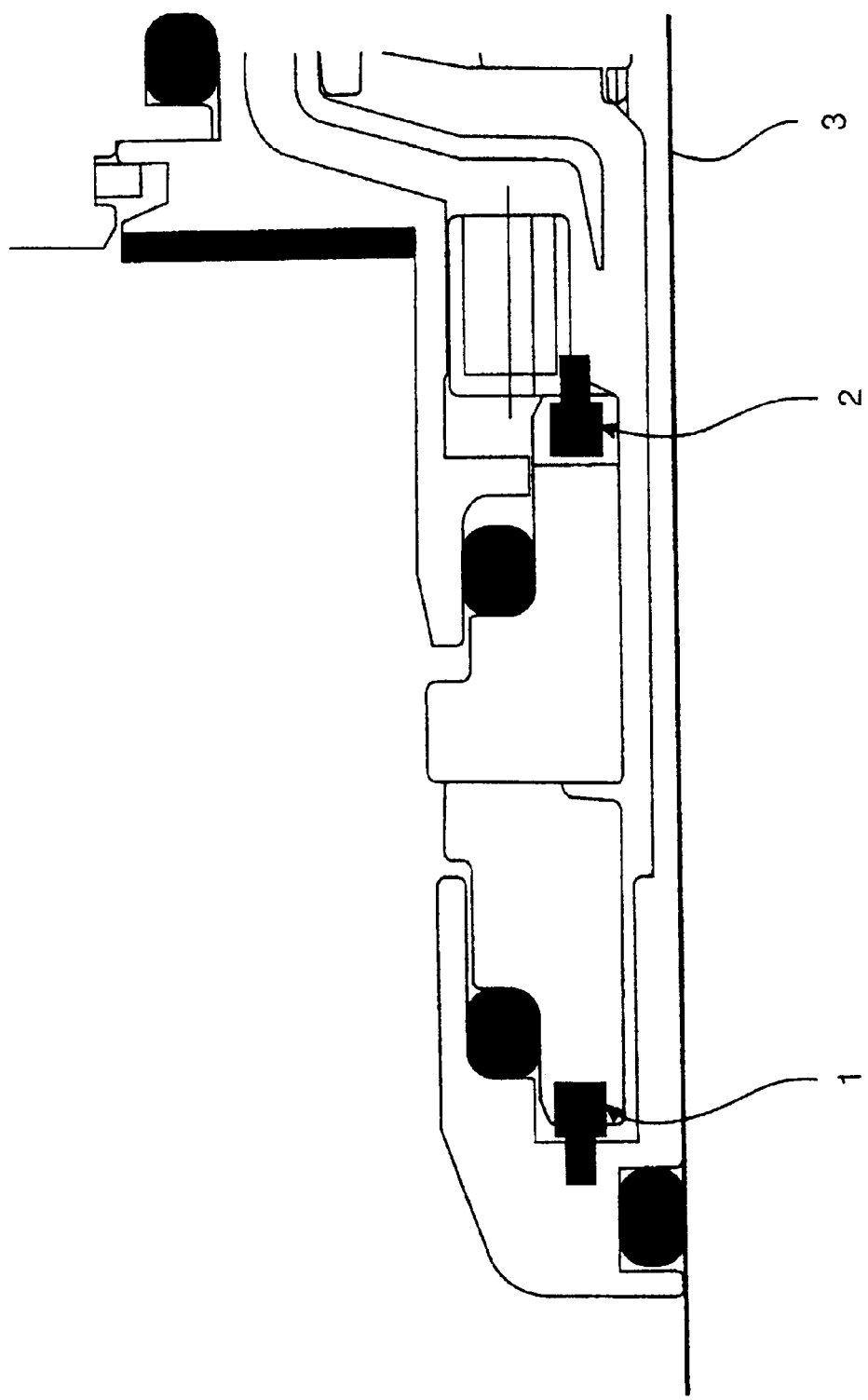
FIG. 8 is a partial longitudinal cross section through a seal of the invention, and illustrates the location of floating pins on the drive ring and slots.

The type of drive can be switched for rotary and stationary faces according to application. Similarly, some pieces of equipment such as shaft (3) and pin (1) in FIG. 8 may be stationary and the other pin (2) may be rotary. It should be understood that the invention may be used with metallic components as well as nonmetallic components.

Depending upon the application of the seal, a floating pin of the present invention may be located at any position or angle relative to the seal faces.

What is claimed is:

1. A mechanical seal to provide sealing between a rotatable shaft and a housing, the seal having a stationary part for connection to the housing and a rotary part for rotation with the shaft, mating sealing faces being carried by said stationary and rotary parts, said rotary part being for mounting on the shaft for rotation therewith, each said sealing face being held relatively stationary to its respective stationary or rotary part by means of at least one link member extending therebetween, wherein said at least one link member includes a surface shaped to effect surface to surface engagement with a surface on a sealing face and is arranged for at least limited rotation around its longitudinal axis relative to the sealing face with which it engages, wherein one end of the link member is loosely fitted in a hole in the stationary part and the other end of the link member is located in a slot or adjacent a lug on the corresponding sealing face such that the link member is rotatable about its longitudinal axis relative to the sealing face with which it engages.

2. A mechanical seal to provide sealing between a rotatable shaft and a housing, the seal having a stationary part for connection to the housing and a rotary part for rotation with the shaft, mating sealing faces being carried by said stationary and rotary parts, said rotary part being for mounting on the shaft for rotation therewith, each said sealing face being held relatively stationary to its respective stationary or rotary part by means of at least one link member extending therebetween, wherein said at least one link member includes a surface shaped to effect surface to surface engagement with a surface on a sealing face and is arranged for at least limited rotation around its longitudinal axis relative to the sealing face with which it engages, wherein one end of the link member is loosely fitted in a hole on the rotary part and the other end of the link member is located in a slot or adjacent a lug on the corresponding sealing face such that it is rotatable about its longitudinal axis relative to the sealing face with which it engages.

3. A mechanical seal to provide sealing between a rotatable shaft and a housing, the seal having a stationary part for connection to the housing and a rotary part for rotation with the shaft, mating sealing faces being carried by said stationary and rotary parts, said rotary part being for mounting on the shaft for rotation therewith, each said sealing face being held relatively stationary to its respective stationary or rotary part by means of at least one link member extending therebetween, wherein said at least one link member includes a surface shaped to effect surface to surface engagement with a surface on a sealing face and is rotatable around its longitudinal axis relative to the sealing face with which it engages, wherein the rotary part and corresponding sealing face are connected with the link member whose longitudinal axis extends radially with respect to the rotary part.

4. A mechanical seal to provide sealing between a rotatable shaft and a housing, the seal having a stationary part for connection to the housing and a rotary part for rotation with the shaft, mating sealing faces being carried by said stationary and rotary parts, said rotary part being for mounting on the shaft for rotation therewith, each said sealing face being held relatively stationary to its respective stationary or rotary part by means of at least one link member extending therebetween, wherein said at least one link member includes a surface shaped to effect surface to surface engagement with a surface on a sealing face and is rotatable around its longitudinal axis relative to the sealing face with which it engages, wherein the seal is a double seal having two sets of faces and link members between each rotary and stationary parts.

5. A mechanical seal to provide sealing between a rotatable shaft and a housing, the seal having a stationary part for connection to the housing and a rotary part for rotation with the shaft, mating sealing faces being carried by said stationary and rotary parts, said rotary part being for mounting on the shaft for rotation therewith, each said sealing face being held relatively stationary to its respective stationary or rotary part by means of at least one link member extending therebetween, wherein said at least one link member includes a surface shaped to effect surface to surface engagement with a surface on a sealing face and is arranged for at least limited rotation around its longitudinal axis relative to the sealing face with which it engages, wherein the link member freely rotate about its longitudinal axis.

6. A mechanical seal to provide sealing between a rotatable shaft and a housing, the seal having a stationary part for connection to the housing and a rotary part for rotation with the shaft, mating sealing faces being carried by said stationary and rotary parts, said rotary part being for mounting on the shaft for rotation therewith, each said sealing face being held relatively stationary to its respective stationary or rotary part by means of at least one link member extending therebetween, wherein said at least one link member includes a surface shaped to effect surface to surface engagement with a surface on a sealing face and is rotatable around its longitudinal axis relative to the sealing face with which it engages, wherein the seal face is made of soft or brittle material.

7. A mechanical seal according to claim 6 wherein the seal face is made of carbon.

* * * * *